US000001252H

United States Statutory Invention Registration [19]

[11] Reg. Number: H1252

Wade, Jr. et al.

[43] Published: Nov. 2, 1993

[54] METHOD OF INCREASING DIELECTRIC BREAK-DOWN STRENGTHS OF THERMOPLASTIC FILMS

[75] Inventors: William L. Wade, Jr., Neptune; Robert J. Mammone, So. Plainfield, both of N.J.; Michael Binder, Brooklyn, N.Y.

[73] Assignee: The United States of America as represented by the Secretary of the Army, Washington, D.C.

[21] Appl. No.: 888,227

[22] Filed: May 26, 1992

[51] Int. Cl.[5] ..... C08K 5/01
[52] U.S. Cl. ..... 524/487
[58] Field of Search ..... 524/487

[56] References Cited

U.S. PATENT DOCUMENTS 4,551,499 11/1985 Cranfield et al. ..... 524/487

*Primary Examiner*—Robert L. Stoll
*Assistant Examiner*—Joseph D. Anthony
*Attorney, Agent, or Firm*—Michael Zelenka; Roy E. Gordon

[57] ABSTRACT

A method is provided of increasing the dielectric break-down strength of thermoplastic films such as thin films of polypropylene obtained from polypropylene resin powder. The method involves melt extruding the resin powder with a small amount of ceresine wax.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF INCREASING DIELECTRIC BREAK-DOWN STRENGTHS OF THERMOPLASTIC FILMS

GOVERNMENT INTEREST

The invention described herein may be manufactured, used, and licensed by or for the Government for governmental purposes without the payment to us of any royalty thereon.

FIELD OF INVENTION

This invention relates in general to a method of increasing the dielectric breakdown strength of thermoplastic films such as polypropylene (PP) films obtained from PP resin powder, and in particular to such a method wherein the PP resin powder is melt extruded into a PP film containing small amounts of ceresine wax uniformly distributed throughout the film.

BACKGROUND OF THE INVENTION

High quality, high reliability, spirally wound, film capacitors for industrial applications require high quality dielectric films. Film limitations are generally due to poor insulation resistance and/or low dielectric breakdown strengths.

Dielectric breakdown strengths, $V_b$, of thin polymer films play a key role in determining ultimate attainable energy densities when these films are used as dielectrics in capacitor applications. This is because attainable energy densities of film capacitors increase as the square of the voltage across the capacitor. If $V_b$ of polymer films can be increased these films can be made thinner, or in other words, capacitors can be operated at higher voltages that translate into higher electrostatic energy densities.

SUMMARY OF THE INVENTION

The general object of this invention is to provide a method of increasing the dielectric breakdown strength of thermoplastic films such as PP films obtained from PP resin powder. A more particular object of the invention is to provide such a method wherein the PP film is formed from the PP resin powder by melt extrusion.

It has now been found that the aforementioned objects can be attained by melt extruding PP resin powder with a small amount of ceresine wax uniformly distributed throughout the resin. Melt extruding PP resin powder with 1 weight percent to 2 weight percent ceresine wax yields thin films with significantly increased dielectric breakdown strengths but with virtually no change in bulk dielectric properties. Ceresine wax is believed to act as a trapping center for electrons and by minimizing ionization of the host molecules, dielectric breakdown strength is increased. In lieu of PP resin powder, one can use other thermoplastic resin powders such as polyethylene, polyvinylidene fluoride or trifluorethylene or copolymers of these materials. In lieu of ceresine wax, one can use other hydrocarbons that can act as tripping centers for electrons, such as naphthalene, anthracene, or other long chain molecules such as paraffins.

DESCRIPTION OF THE PREFERRED EMBODIMENT

Polypropylene pellets are first ground to a powder using a 20 mesh delivery tube and an intermediate size grinding mill. In order to uniformly disperse ceresin wax in PP powder, the following procedure is used. Approximately 0.24 grams of Ceresine wax dissolved in 100 cc of m-xylene is added to approximately 24 grams of ground up PP resin and gently heated to the boiling point of m-xylene. Upon cooling the solution, a rubbery gel is formed. This gel contains m-xylene which must be removed. We chose not to remove m-xylene by simply boiling it off since the high temperatures cause PP to turn orange, probably due to oxidation. In order to remove the m-xylene at lower temperatures, approximately 100 cc of ethyl ether is added to the gel and mixed well. We use ethyl ether as the extracting solvent since m-xylene is infinitely soluble in it, but ethyl ether does not dissolve either PP or ceresine wax. This mixture (PP, ceresine wax, m-xylene, ethyl ether) is then filtered through a fritted glass funnel in a sidearm distillation flask and the resulting white, fluffy material is vacuum dried at room temperature for at least three hours. After drying, the odorless material is milled in the grinding mill using a 20 mesh delivery tube and sieved by vibrating it through a series of stainless steel sieves. Only those portions captured on 30 or 40 mesh sieves are used for extruding films whose dielectric properties are reported here.

Translucent films, approximately 25 microns thick and 40 mm wide, are melt extruded from PP resin powder with and without 1% or 2% added ceresine wax. The resin is extruded through a half inch (12.7 mm) lab scale, screw type, microextruder under the following conditions: length to diameter ratio 24:1, screw RPM: 50, die temperature: 450 F.; temperature of barrel zone 1: 350 F.; barrel zone 2: 400 F. and barrel zone 3: 450 F.

PP resins containing 1% and 2% ceresine wax that have been melt extruded under identical conditions yield films having distinctly different thicknesses. This may be due to different flow characteristics of the resin containing added ceresine wax. Assuming that added ceresine wax increases the flow rates of resin through the extruder, more resin will be extruded per second and the resulting films will be thicker. This is indeed observed. For example, under identical extrusion conditions, films extruded from baseline PP resin are 11 micron thick; films extruded from resin containing 1% and 2% ceresine wax are 24 microns thick. In order to obtain measurements on comparable film thicknesses, the screw speed for extruding baseline resin has to be increased (from 50 RPM to 100 RPM). Voltage breakdown of these films is measured at room temperature by placing them between two pools of mercury and ramping the voltage at 500 volts per second until breakdown occurs and the film can not hold off additional voltage.

Dielectric properties including breakdown voltages for films of approximately similar thicknesses containing 1% and 2% added ceresine wax are listed in Table 1.

TABLE 1

Comparison of dielectric constants, dielectric losses and breakdown voltages for films formed by melt extruding PP resin containing 1% and 2% ceresine wax. PP refers to resin that has been milled and melt extruded. PP* refers to baseline PP resin that has been milled, mixed with m-xylene and extracted with ethyl ether but not containing any added ceresine wax. PP* + 1% wax refers to PP resin containing 1% added ceresine wax as described in the text.

| | PP | PP* | PP* + 1% wax | PP* + 2% wax |
|---|---|---|---|---|
| Thickness, microns | 25 | 26 | 19 | 24 |
| Dielectric | | | | |

TABLE 1-continued

Comparison of dielectric constants, dielectric losses and breakdown voltages for films formed by melt extruding PP resin containing 1% and 2% ceresine wax. PP refers to resin that has been milled and melt extruded. PP* refers to baseline PP resin that has been milled, mixed with m-xylene and extracted with ethyl ether but not containing any added ceresine wax. PP* + 1% wax refers to PP resin containing 1% added ceresine wax as described in the text.

| | PP | PP* | PP* + 1% wax | PP* + 2% wax |
|---|---|---|---|---|
| constant | | | | |
| @ 1000 Hz | 2.19 | 2.13 | 2.12 | 2.10 |
| @ 10,000 Hz | 2.19 | 2.13 | 2.12 | 2.09 |
| Dielectric loss ($\times 10^4$) | | | | |
| @ 1000 Hz | 6.6 | 6.1 | 4.1 | 5.1 |
| @ 10,000 Hz | 5.5 | 5.7 | 4.4 | 4.9 |
| Breakdown Voltage | | | | |
| KV/mil | 5.2 | 5.4 | 7.7 | 8.0 |

Although dielectric properties are essentially unchanged for the different PP samples, their breakdown voltages are apparently quite different. The first important point to notice is that there is no appreciable difference in dielectric breakdown voltage between baseline PP resin and PP resin that has undergone the extraction procedure with ether. This shows that baseline PP resin is relatively pure and that no significant amount of removable impurities are present. Had the resin contained extractable impurities, films prepared from PP resin that had undergone extraction should have yielded significantly higher $V_b$ values, Addition of only 1% or 2% ceresine wax to PP resin yields a film having more than 40% increase in $V_b$. One explanation for this increase upon addition of ceresine wax may be the following. When high energy electrons are injected from contacting metal electrodes under D.C. fields, they become trapped around resonating aromatic rings of the added trapping molecule so rapidly that they do not reside in any one bond long enough to break it. Since these electrons become localized around the trap molecule, their mean free path is reduced and their energies are dissipated as heat without ionizing and/or causing damage to host molecules. $V_b$ is therefore increased. All of this can be accomplished without substantially decreasing bulk dielectric constants or increasing bulk dielectric losses. The addition of wax may trap electrons and thereby strongly contribute to increased $V_b$.

We wish it to be understood that we do not desire to be limited to the exact details of construction as described for obvious modifications will occur to a person skilled in the art.

What is claimed is:

1. Method of increasing the dielectric breakdown strength of thin thermoplastic films from a thermoplastic resin powder comprising melt extruding the resin powder with a small amount of a hydrocarbon that can act as a trapping center for electrons.

2. Method according to claim 1 wherein the thermoplastic resin is selected from the group consisting of polypropylene, polyethylene, polyvinylidene fluoride, and trifluoroethylene and copolymers of these materials and wherein the hydrocarbon that can act as a trapping center for electrons is selected from the group consisting of ceresine wax, naphthalene, anthracene, and paraffins.

3. Method according to claim 2 wherein the thermoplastic resin is polypropylene and wherein the hydrocarbon that can act as a trapping center for electrons is ceresine wax.

4. Method according to claim 3 wherein the small amount of ceresine wax is about one weight percent to about two weight percent.

5. A thin thermoplastic resin film with a small amount of a hydrocarbon that can act as a trapping center for electrons uniformly distributed throughout the resin films.

6. A thin thermoplastic resin film according to claim 5 wherein the thermoplastic resin film is selected from the group consisting of polypropylene, polyethylene, polyvinylidene fluoride, trifluorethylene, and copolymers of these materials and wherein the hydrocarbon that can act as a trapping center for electrons is selected from the group consisting of ceresine wax, naphthalene, anthracene and paraffins.

7. A thin thermoplastic resin film according to claim 6 wherein the thermoplastic resin is polypropylene and wherein the hydrocarbon that can act as a trapping center for electrons is ceresine wax.

* * * * *